United States Patent
Shimosakoda

(10) Patent No.: US 7,570,664 B2
(45) Date of Patent: Aug. 4, 2009

(54) SYNCHRONIZATION CORRECTION CIRCUIT FOR CORRECTING THE PERIOD OF CLOCK SIGNALS

(75) Inventor: Yoshinori Shimosakoda, Tokyo (JP)

(73) Assignee: Oki Semiconductor Co., Ltd., Tokyo (JP)

(*) Notice: Subject to any disclaimer, the term of this patent is extended or adjusted under 35 U.S.C. 154(b) by 1570 days.

(21) Appl. No.: 10/270,608

(22) Filed: Oct. 16, 2002

(65) Prior Publication Data

US 2003/0177272 A1    Sep. 18, 2003

(30) Foreign Application Priority Data

Mar. 13, 2002 (JP) .............................. 2002-067927

(51) Int. Cl.
*H04J 3/06* (2006.01)
*H04L 7/00* (2006.01)

(52) U.S. Cl. .................................... 370/503; 375/365

(58) Field of Classification Search ................ 370/503, 370/505, 507, 508, 509; 375/354, 355.357, 375/362, 365
See application file for complete search history.

(56) References Cited

U.S. PATENT DOCUMENTS 3,733,432 A * 5/1973 Arimura et al. ............... 386/19
5,717,661 A * 2/1998 Poulson ...................... 368/202
6,546,065 B1 * 4/2003 Shimosakoda ............... 375/365
6,603,830 B1 * 8/2003 Finsterbusch et al. ....... 375/362
7,133,397 B2 * 11/2006 Jones et al. ................. 370/350

FOREIGN PATENT DOCUMENTS

JP          2000244467          9/2000

* cited by examiner

*Primary Examiner*—Aung S Moe
*Assistant Examiner*—Kerri M Rose
(74) *Attorney, Agent, or Firm*—Volentine & Whitt, P.L.L.C.

(57) ABSTRACT

A transmission interval counter measures the period of a packet sync generated in a sync generator. A comparator compares the period of the packet sync to a reference interval as selected by a type selector to calculate a period error. A correction value calculator calculates a correction value based on the period error. An adder sums the correction value to a predetermined value to output a sum. A frequency dividing counter counts the high-speed clock signals to output its count, and is reset by a pulse. A comparator outputs the pulse when the count coincides with the sum. A circuit generates clocks synchronized with the pulses. A circuit frequency-divides the clocks by ⅛ to generate synchronization signals.

9 Claims, 10 Drawing Sheets

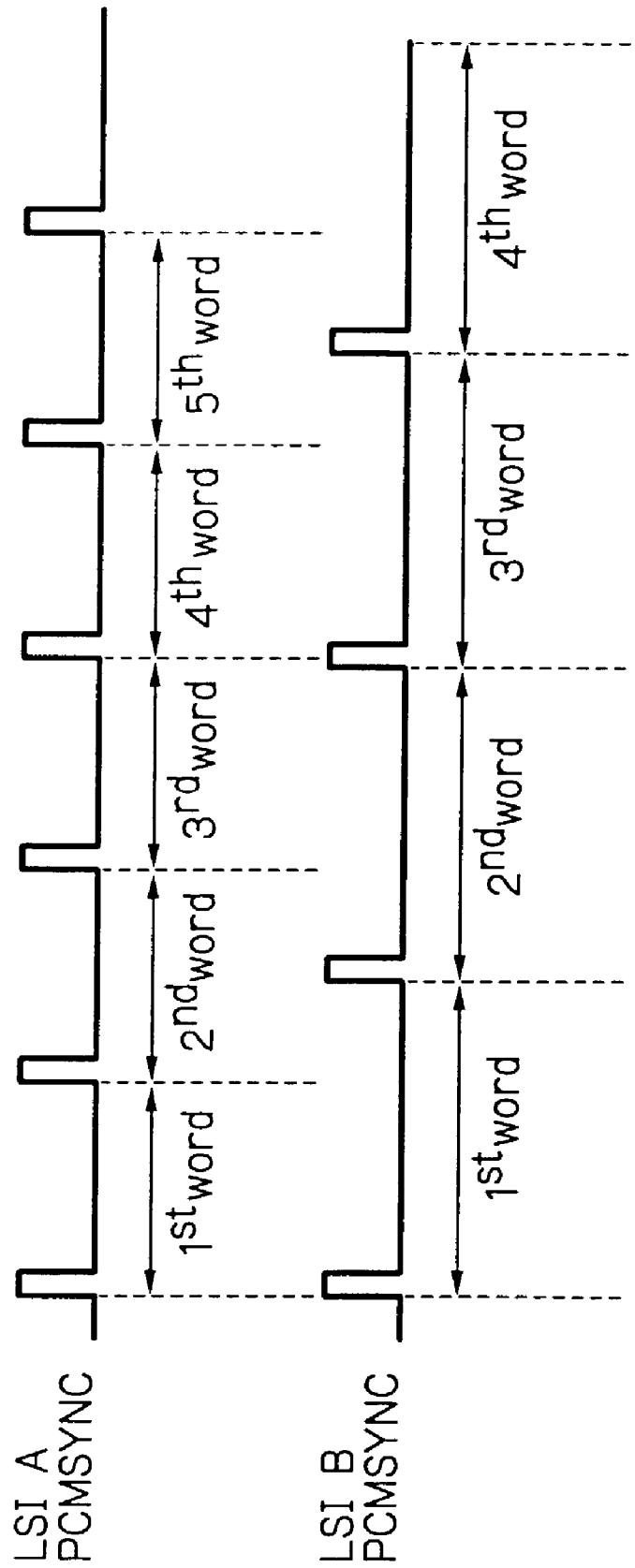

SYNCHRONIZATION CORRECTION CIRCUIT FOR CORRECTING THE PERIOD OF CLOCK SIGNALS

BACKGROUND OF THE INVENTION

1. Field of the Invention

The present invention relates to a synchronization correction circuit in which the period of clock signals is corrected in accordance with variations in the period of a received packet. More particularly, it relates to the synchronization correction circuit used in radio equipment to which Bluetooth, as one of the radio communication specifications or standards, is applied.

2. Description of the Background Art

Among the radio communication standards applied to a radio communication system for interconnection between equipment lying at a close distance to each other on the order of 10 meters, for example, between a personal computer and peripheral equipment, there is a specification or standard termed Bluetooth. In the telecommunication system to which the Bluetooth is applied, a master and a slave alternately transmit and receive packets, every time slot of 625 μsec, in repeated fashion, as shown in FIG. 8A, to transmit packets. Meanwhile, packets may be transmitted over two or more time slots, as shown in FIGS. 8B and 8C.

In Bluetooth, three types of packets are defined as packets used for transmitting or receiving voice data. Of these, a packet of the type HV 1 is used in an application in which voice data of 10 bytes are transmitted or received at a transmission interval of 1.25 msec, a packet of the type HV 2 is used in case voice data of 20 bytes are transmitted or received at a transmission interval of 2.5 msec, and a packet of the type HV 3 is used in an application in which voice data of 30 bytes are transmitted or received at a transmission interval of 3.75 msec. A voice packet includes a synchronization word (sync word) and a payload. The payload carries voice data.

FIG. 9 is a block diagram schematically showing the structure of a conventional radio transmitter-receiver used as a master or as a slave. A high frequency unit 70 transmits and receives a packet with high frequency signals of 2.4 GHz, using a spread spectrum system and a GFSK (Gaussian frequency shift keying) modulation/demodulation system. A baseband processing unit 72 executes processing for establishing and managing a link with another equipment, under the control of a controller (CPU) 76 which is connected thereto over a bus (CPUBUS) 78. For example, the baseband processing unit 72 assembles a packet 160 of voice data 158 to output the resulting packet to the high frequency unit 70, while disassembling the packet 150 received form the high frequency unit 70 to take out voice data 152.

A voice data converter 74 is used for reciprocally converting the encoding scheme for voice data 152, 158, transferred to and from the baseband processing unit 72, and the encoding scheme for voice data 154, 156, transferred to and from a PCM (pulse code modulation) CODEC. Specifically, the voice data converter 74 selects each one of three encoding schemes that can be coped with by the baseband processing unit 72, namely CVSD (continuously variable slope delta modulation) A-law and μ-law, and each one of three schemes that can be coped with by the PCM CODEC, namely PCM linear, A-law and μ-law, under the control of the controller 76, to reciprocally convert the encoding scheme.

In the so constructed radio transmitter-receiver, clock signals or synchronization signals, used for reciprocally converting the encoding schemes in the voice data converter 74, are generated on the basis of a signal output from an independent transmission source.

However, it is a frequent occurrence that the frequency of the transmission source in a master and that of a slave in actuality differ delicately from each other. If, in such a case, the demodulated voice data is processed in the slave using clock signals or synchronization signals, generated on the basis of a signal output from the independent transmission source, data overflow or underflow necessarily occurs.

For example, in an application where voice data are transmitted from a device A to a device B, which may be LSIs (large scale integration), if the rate of system clocks in the LSI A is faster than that in the LSI B, the period of the synchronization signal (PCMSYNC) of the LSI A is then smaller than that of the synchronization signal (PCMSYNC) of the LSI B as shown FIG. 10, so that the data volume transmitted from the LSI A becomes larger than the data volume processed by the LSI B, thus producing overflow in the LSI B. If conversely the voice data are transmitted from the LSI B to LSI A, the processing data volume is in shortage in the LSIA, thus producing underflow. Such overflow and underflow cause speech quality to be deteriorated.

SUMMARY OF THE INVENTION

In view of the above-described state of the art, it is an object of the present invention to provide a synchronization correction circuit in which the period of clock signals generated on the basis of signals output from a independent oscillator in a slave may be controlled responsive to variations in the period or transmission interval of packets transmitted from a master.

For overcoming the above problem, the present invention provides a synchronization correction circuit including a synchronization signal generator for detecting a synchronization word contained in a received packet to generate a packet synchronization signal synchronized with the received packet, a period error detector for measuring the period of the packet synchronization signal generated in the synchronization signal generator to calculate a period error with respect to a reference interval, a first correction value calculator for calculating a period correction value per one clock signal and the number of clock signals to be corrected for the clock period so that a sum of the period correction values per one clock signal will be coincident with the period error, and a clock signal generator for generating clock signals of a predetermined reference period when the period correction value is zero, and for generating, when the period correction value is different than zero, a number calculated in the first correction value calculator of clock signals, the period of which has been corrected based on the period correction value.

The present invention also provides a synchronization correction circuit including a synchronization signal generator for detecting a synchronization word contained in a received packet to generate a packet synchronization signal synchronized with the received packet, a period error detector for measuring the period of the packet synchronization signal generated in the synchronization signal generator to calculate a period error with respect to a reference interval, a first cumulative error counter for cumulating a period error as calculated by the period error detector every plural periods of the packet synchronization signals to calculate a cumulative period error, a first correction value calculator for calculating a period correction value per one clock signal and the number of clock signals to be corrected for the clock period so that a sum of the period correction values per one clock signal will be coincident with the cumulative period error, and a clock signal generator for generating clock signals of a predetermined reference period when the period correction value is zero, and for generating, when the period correction value is different than zero, a number calculated in the first correction value calculator of clock signals, the period of which has been corrected based on the period correction value.

The present invention further provides a synchronization correction circuit including a synchronization signal generator for detecting a synchronization word contained in a received packet to generate a packet synchronization signal synchronized with the received packet, a period error detector for measuring the period of the packet synchronization signal generated in the synchronization signal generator to calculate a period error with respect to a reference interval, a second cumulative error counter for sequentially cumulating the period errors calculated in the period error detector for sequentially outputting the cumulated period errors each time the period errors have been cumulated, a comparator for comparing the cumulated period errors output from the second cumulative error counter to a threshold value to output a trigger when the cumulated period error has exceeded the threshold value, a second correction value calculator for calculating a period correction value per one clock signal and the number of clock signals to be corrected for clock period, when the trigger is output from the comparator, so that a sum of the period correction values per one clock signal will be coincident with the threshold value, and a clock signal generator for generating clock signals of a predetermined reference period when the period correction value is zero, and for generating, when the period correction value is different than zero, a number calculated in the second correction value calculator of clock signals, the period of which has been corrected based on the period correction value. The second cumulative error counter subtracts the period correction value from the cumulated period errors when the trigger is output from the comparator.

With the synchronization correction circuit, according to the present invention, the period of the clock signals is corrected responsive to period variations of the received packet to cause the intra-device transmission period to be equal to the period of the received packet (transmission interval), so that, with the use of the clock signals, it is possible to prevent underflow or overflow which would otherwise present problems in processing speech data transmitted from a master.

By correcting the period of clock signals at a period equal to a multiple of the period of the received packet, it is possible to diminish the power consumption as compared to a case wherein the clock signal period is corrected with the period of the received packet. It is also possible to diminish changes in the bit rate of the clock signals by the correction processing to provide for correction uniformity.

By commencing the correction of the clock signal period when the cumulative error of the received packet period has exceeded a preset threshold, it becomes unnecessary to change the bit rate laboriously in contradistinction from the case where the period correction is performed every received packet period to render it possible to transmit the speech data at all times at a constant sound quality.

BRIEF DESCRIPTION OF THE DRAWINGS

The objects and features of the present invention will become more apparent from consideration of the following detailed description taken in conjunction with the accompanying drawings in which:

FIG. 10 is a time chart useful for understanding the cause of the occurrence of overflow and underflow.

DESCRIPTION OF THE PREFERRED EMBODIMENTS

Figure 1:
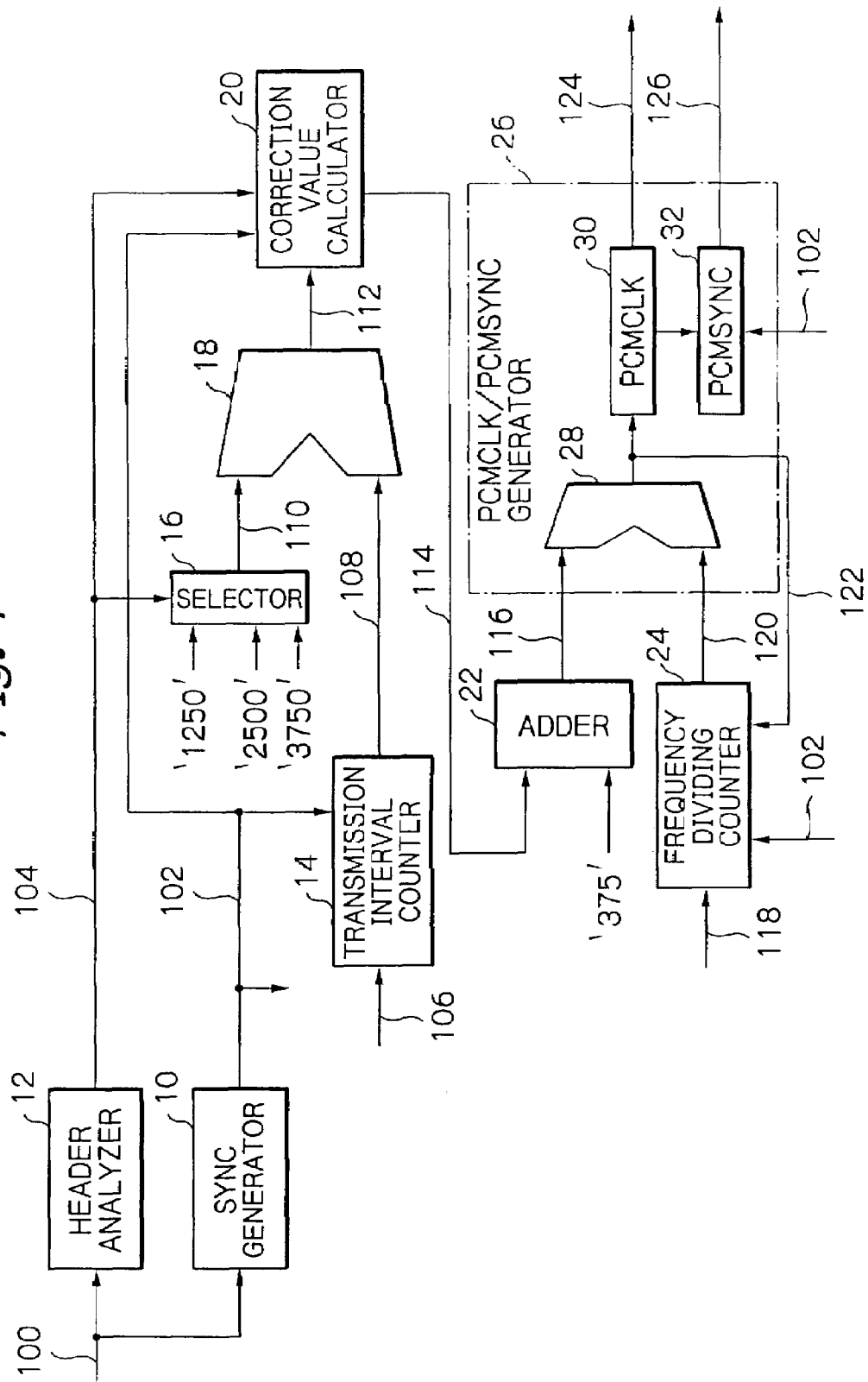
FIG. 1 is a schematic block diagram showing a synchronization correction circuit according to a first embodiment of the present invention.

Referring to the drawings, preferred embodiments of a synchronization correction circuit according to the present invention will be described in detail. FIG. 1 shows, in a schematic block diagram, a first embodiment of a synchronization correction circuit according to the present invention. This synchronization correction circuit is adapted for generating clock signals (PCMCLK) 124 and synchronization signals (PCMSYNC) 126 for voice data transfer. The period of the clock signals 124 is changed responsive to variations in the period of a packet synchronization signal 102. Meanwhile, the reference numerals entered on connection lines also indicate signals appearing on the connection lines.

To a sync generator 10 and a header analyzer 12 shown in FIG. 1 input is a received packet 100 transmitted from a master device, not shown. The sync generator 10 is adapted to detect a sync word included in the received packet 100 to generate a packet sync (packet synchronization signal) 102 synchronized with the received packet 100. The header analyzer 12 is adapted to detect the packet type information included in the received packet 100 to generate a packet type signal 104 specifying the packet type.

The synchronization correction circuit also includes a transmission interval counter 14, connected to the sync generator 10, a type selector 16, connected to the header analyzer 12, and a comparator 18, connected to the transmission interval counter 14 and to the type selector 16, which make up period error detection circuitry for detecting period errors of the packet sync 102. The transmission interval counter 14 is adapted for counting clock signals 106, as it is reset by the packet sync 102, to measure the period of the packet sync 102. It should be noted that, in the present embodiment, since the frequency of the clock signal 106 is set to 1 MHz, the period of the packet synchronization signal 102 can be measured to an accuracy of 1 μsec.

The type selector 16 is a selection circuit for selecting one of the values '1250', '2500' and '3750' in accordance with the packet type. Specifically, the type selector 16 selects the values '1250', '2500' and '3750' when the packet type signal 104 output from the header analyzer 12 indicates the packet types HV 1, HV 2 and HV 3, respectively. The type selector 16 outputs the so selected value as a reference interval 110. Meanwhile, the reference transmission intervals corresponding to the packet types HV 1, HV 2 and HV 3 are 1.25 ms, 2.5 ms and 3.75 ms, respectively. If the transmission intervals of 1.25 ms, 2.5 ms and 3.75 ms are measured with the transmission interval counter 14, the measured values are '1250', '2500' and '3750', respectively.

The comparator 18 is a period error detection circuit for comparing a count 108, output from the transmission interval counter 14, to a reference interval 110, output by the type selector 16 to detect an error of the count 108 from the reference interval 110. Specifically, the comparator 18 subtracts a reference interval 110 from the count 108 to output the result of subtraction as a period error 112.

The synchronization correction circuit also includes a correction value calculator 20, connected to the comparator 18 and to the header analyzer 12, which is designed so that, when the packet sync 102 is output from the sync generator 10, the correction value calculator 20 calculates a period correction value 114 and a correction time domain for correcting the period of clocks 124, based on the period error 112 detected in the comparator 18, to output the period correction value 114 during the correction time domain.

The basic concept in calculating the period correction value 114 and the correction time domain is now described. The transmission interval for e.g., the packet type HV 1 is prescribed to 1.25 ms. In the present embodiment, if the transmission interval of the received packet coincides with 1.25 ms, 80 cycles of the clocks 124, with a frequency of 64 kHz (whose period is equal to 15.625 μsec), are output within a period of 1.25 ms. The period within which the 80 cycles of the clocks 124 are output is termed below an intra-device transmission period. However, in actuality, there are many occasions where the transmission interval of packets transmitted from a master is offset from the prescribed value. When the transmission interval is varied and offset from the reference value, if the 80 cycles of the clocks 124 of 64 kHz were directly output, the intra-device transmission period would then be longer or shorter than 1.25 msec, thus possibly causing overflow or underflow.

Thus, in the present embodiment, the period of the clocks 124 is controlled to cause the intra-device transmission period to be coincident with the transmission interval of the received packet. For example, if the transmission interval is 1.249 msec shorter by 1 μsec than the prescribed value of 1.25 msec, 24 cycles of clocks 124, with a period shorter by 1/24μsec than 15.625 μsec, are generated and output, and 56 cycles of the clocks 124 with a period of 15.625 μsec are also output to cause the intra-device transmission period to be coincident with the transmission period of 1.249 msec of the received packet. If conversely the transmission interval is longer by 1 μsec than the prescribed value of 1.25 ms, 24 cycles of clocks 124, with a period longer by 1/24 μg sec than 15.625 μsec, are output, and 56 cycles of the clocks 124 with a period of 15.625 μsec are also output to cause the intra-device transmission period to be coincident with the transmission period of the received packet.

Thus, by increasing or decreasing the period of the clocks 124 by á/M μsec as from 15.625 μsec, and by outputting M cycles of these clocks 124, the intra-device transmission period may be increased or decreased by á μsec, respectively, such that the intra-device transmission period is caused to be coincident with the transmission period of the received packet, where M is a natural number. It should be noted that, with the period of outputting M cycles of the clocks 124, having the period increased or decreased by á μsec, as a correction time domain, and with the increased or decreased quantity (±) á of the period of the clocks 124, as the period correction value 114, the correction value calculator 20 outputs the period correction value 114 with a value of (±) á during the correction time domain, while outputting the period correction value 114 with a value of '0' during a time period or domain other than the correction time domain. Meanwhile, it is possible for the correction value calculator 20 to calculate period correction values 114 and the correction time domain for an error of the transmission interval as anticipated to be produced and at the outset for storage in a memory, and to read out the so stored period correction value 114 and the correction time domain from the memory depending on the period error 112 as detected in the comparator 18.

The synchronization correction circuit includes an adder 22 connected to the correction value calculator 20, and a PCMCLK/PCMSYNC generator 26, connected to the adder 22 and to a frequency dividing counter 24, in addition to the frequency dividing counter 24 connected to the PCMCLK/PCMSYNC generator 26 and to the sync generator 10, making up clock signal generating circuitry for generating clock signals (PCMCLK) 124 for voice data processing, corrected for the period based on the period correction value 114, and synchronization signals (PCMSYNC) 126.

The adder 22 is adapted for summing a pre-set value '375' to the period correction value 114, output from the correction value calculator 20, to output the summed result as a summed value 116. It is noted that the value '375' is a count obtained when the period of clock signals with a frequency of 64 kHz is counted with high-speed clock signals 118 with a frequency of 24 MHz by the frequency dividing counter 24 which will be explained in detail subsequently.

The frequency dividing counter 24 is a binary counter for counting the clock signals 118 with a frequency of 24 MHz and for sequentially outputting counts 120. Specifically, when the packet sync 102 is input from the sync generator 10, the frequency dividing counter 24 starts to count the clock signals 118 and, each time a pulse 122 is supplied from the comparator 28 of the PCMCLK/PCMSYNC generator 26, the frequency dividing counter 24 resets its count to zero and restarts the counting of the clocks 118 as from the state of the null count. Meanwhile, the frequency of the BBCLK 118 is exemplary and not limited to 24 MHz.

The comparator 28 is adapted to compare the summed value 116 output from the adder 22 to a count 120 output from the frequency dividing counter 24 to output a pulse 122 when the count 120 coincides with the summed value 116. Since the frequency dividing counter 24 is reset by the pulse 122, the comparator 28 outputs pulses 122, the period of which is determined by the sum 116. That is, the period of the pulse 122 output from the comparator 28 is changed depending on the sum 116 output from the adder 22.

For example, if the period correction value 114 output from the correction value calculator 20 is 0, the sum 116 output from the adder 22 is '375'. When the count 120 from the frequency-dividing counter 24 coincides with the value '375', the comparator 28 outputs a pulse 122. The frequency-dividing counter 24 is reset by this pulse 122 to repeat the counting at a period of 15.625 μsec (which is equal to 1/24 μsec×375). Consequently, the period of the pulse 122 is 15.625 μsec. If, for example, the period correction value 114 is −1, the sum 116 is '374', such that the comparator 28 outputs a pulse 122 when the count 120 coincides with '374'. The frequency-dividing counter 24 is reset by this pulse 122 to repeat the counting at a period of 15.583 μsec (equal to 1/24 μsec×374). Consequently, the period of the pulse 122 is 15.583 μsec.

The PCMCLK/PCMSYNC generator 26 also includes a PCMCLK generator 30, connected to the comparator 28, which is a synchronization pulse generating circuit for shaping the waveform of the pulse 122 to generate clocks 124 synchronized with the pulses 122. The PCMCLK/PCMSYNC generator 26 further includes a PCMSYNC generator 32, connected to the PCMCLK generator 30, that functions as a frequency divider which, when the packet sync 102 is sent from the sync generator 10, resets its count for frequency-dividing the clocks 124, generated by the PCMCLK generator 30, by for example 1/8 to generate synchronization signals 126 synchronized with the word of voice data. Meanwhile, the clocks 124 and synchronization signals 126 are sent to a voice data converting unit or to a voice CODEC.

In operation, the sync generator 10 outputs the packet sync 102 synchronized with the received packet 100. The header analyzer 12 outputs a packet type signal 104, indicating the packet type. The transmission interval counter 14 measures the period of the packet sync 102 output from the sync generator 10 to output a count 108 to the comparator 18. On the other hand, the type selector 16 selects, from among the values '1250', '2500' and '3750', a value corresponding to the packet type specified by the packet type signal 104, output by the header analysis unit 12, and outputs the so selected value as a reference interval 110 to the comparator 18. If, for example, the packet type signal 104 indicates type HV 1, the type selector 104 selects and outputs the value '1250'.

Figure 2:
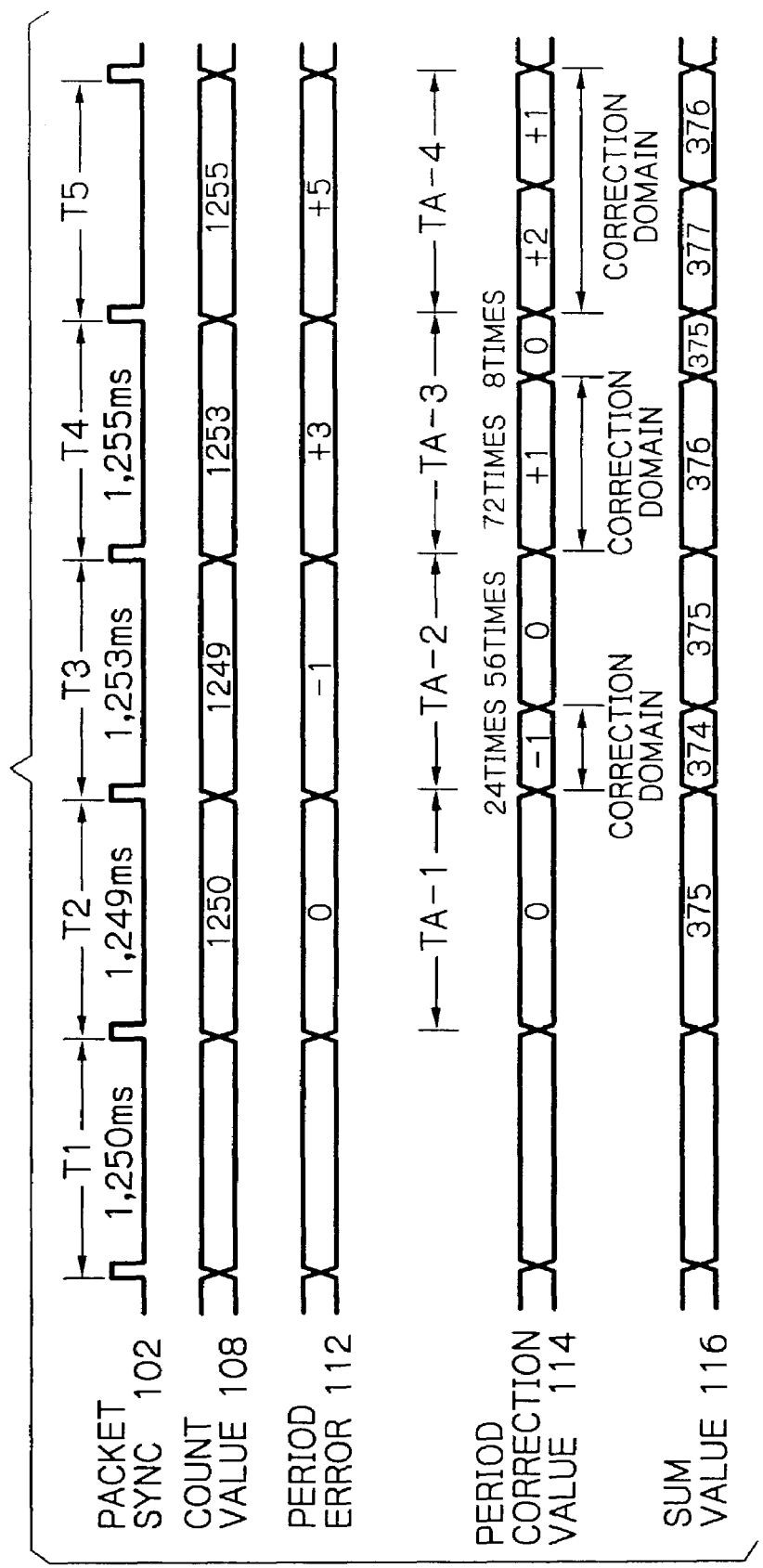
FIG. 2 is a timing chart useful for understanding the operation of the synchronization correction circuit shown in FIG. 1.

The comparator 18 subtracts the reference interval 110 from the count 108 to output the difference as the period error 112 to the correction value calculator 20. The correction value calculator 20 calculates the period correction value 114 and the correction time domain for correcting the period of the clocks 124 based on the period error 112 output from the comparator 18. The maximum of the correction time domain is limited within the reference interval indicated by the packet type signal 104, output from the header analyzer 12. If the count 108 of the transmission interval counter 14 for the periods T1 to T3 of the packet synchronization signal 102 is '1250', '1249' or '1253', as shown FIG. 2, the value of the period error 112 output from the comparator 18 is 0, −1 and +3, respectively.

Since the period error 112 with respect to the period T1 is 0, the correction value calculator 20 determines that the intra-device transmission period does not have to be corrected. Thus, in the intra-device transmission period TA-1, the leading end of which is synchronized with the leading end of the period T2, the value of the period correction value 114 is set to 0. On the other hand, since the period error 112 for the period T2 is −1, the correction value calculator 20 determines that the intra-device transmission period has to be made shorter by 1 μsec, and hence calculates the period correction value 114 and the correction time domain so that 24 cycles of the clocks 124, with a period of (15.625−1/24) μsec, will be output from the PCMCLK generator 30. In the intra-device transmission period TA-2, the leading end of which is synchronized with the leading end of the period T3, the period correction value 114 with a value '1' is output during the correction time domain, while outputting the period correction value 114 with the value '0' during a time domain or time period other than the correction time domain.

Since the period error 112 with respect to the period T3 is +3, the correction value calculator 20 determines that the intra-device transmission period has to be longer by 3 g sec, and calculates the period correction value 114 and the correction time domain so that 72 cycles of the clocks 124 with the period of (15.625+1/24 μsec) will be output from the PCMCLK generator 30. In the intra-device transmission period TA-3, the leading end of which is synchronized with the leading end of the period T4, the correction value calculator 20 outputs the period correction value 114 with a value +1 during the correction time domain, while outputting the period correction value 114 with a value '0' during a time domain other than the correction time domain. In similar manner, in the intra-device transmission period TA-4, the leading end of which is synchronized with the leading end of the period T5, the correction value calculator 20 outputs the period correction value 114 with a value +2 in the former half of the correction time domain (time period corresponding to 40 cycles of the clocks 124), while outputting the period correction value 114 with a value +1 in the latter half of the correction time domain (time period corresponding to 40 cycles of the clocks 124).

The period correction value 114, calculated in the correction value calculator 20, is input to the adder 22. The adder 22 adds the value '375' to the period correction value 114 to output the resulting sum 116 to the comparator 28 of the PCMCLK/PCMSYNC generator 26. On the other hand, the frequency dividing counter 24 counts 24 MHz clock signals 118 to sequentially output the resulting counts 120 to the comparator 28. The comparator 28 compares the count 120 to the sum 116 and outputs the pulses 122 to each of the PCMCLK generator 30 and to the frequency dividing counter 24, when the count 120 coincides with the sum 116.

The frequency dividing counter 24 starts counting when the packet sync 102 is sent thereto from the sync generator 10. When a pulse is sent from the comparator 28, the frequency dividing counter 24 resets the count to '0' to restart the counting of the clocks 118. This sequence of operations is repeated. The comparator 28 thus outputs the pulses 122 of a period corresponding to the sum 116 output from the adder 22. For example, if the sum 116 is '375', that is if the correction value 114 is "0", the period of the pulse 122 is 15.625 μsec, whereas, if the sum 116 is '374', that is if the correction value 114 is −1, the period of the pulse 122 is 15.583 μsec.

The PCMCLK generator 30 of the PCMCLK/PCMSYNC generator 26 adjusts the pulse width of the pulse 122 output from the comparator 28 to generate the clocks 124 synchronized with the pulses 122. The PCMSYNC generator 32 divides the frequency of the clocks 124 output from the PCMCLK generator 30, by 1/8 to generate the synchronization signals 126.

Thus, with the first embodiment, the packet sync 102 synchronized with the transmission interval of the packet sent from the master is generated and the period of the clocks 124 is corrected responsive to period variations of the packet synchronization signal 102 to cause the intra-device transmission period to be coincident with the transmission interval of the packet sent from the master. Thus, by employing these clocks 124, it is possible to prevent the occurrence of underflow or overflow which poses problems in processing voice data transmitted from the master.

Figure 3:
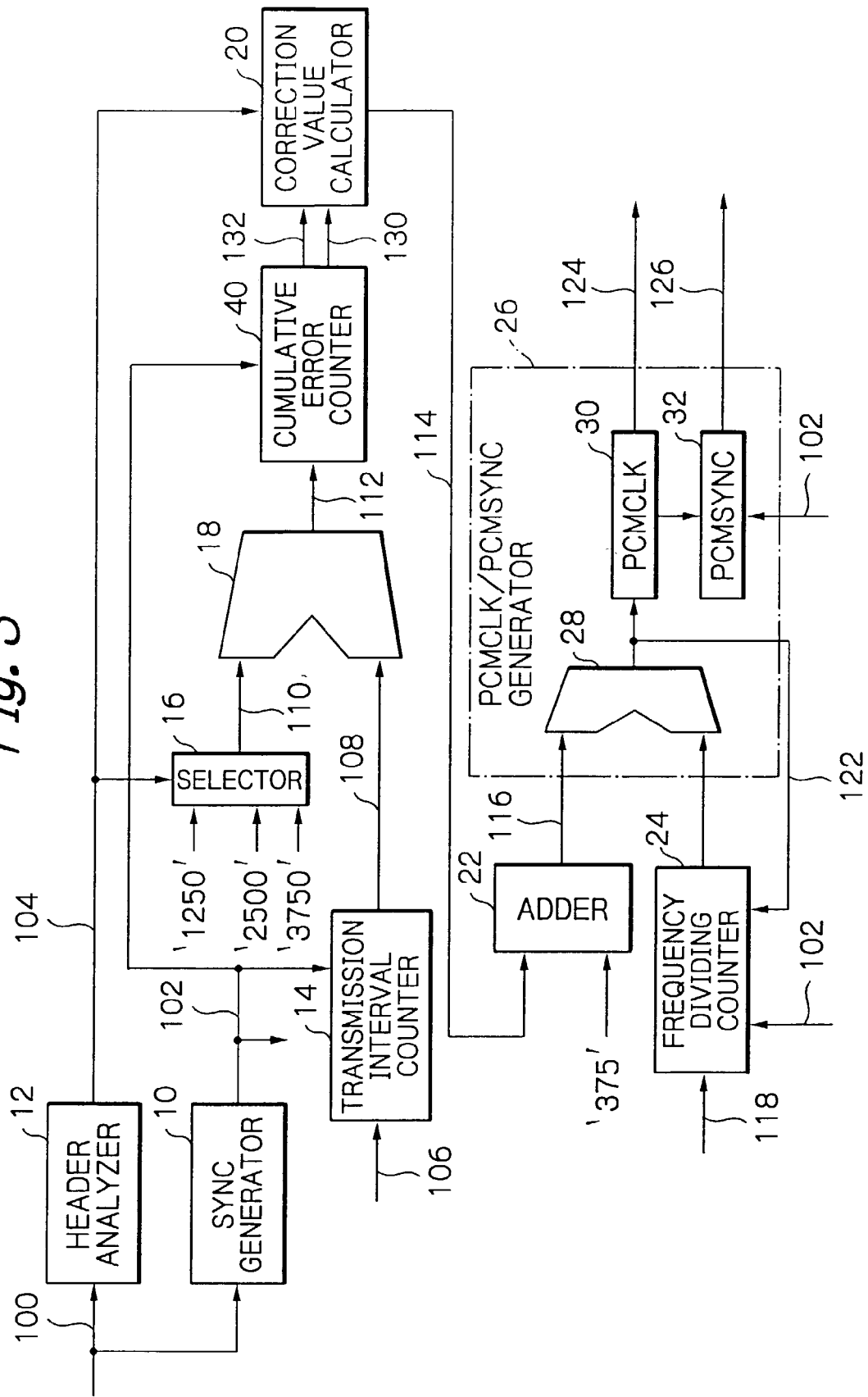
FIG. 3 is a schematic block diagram, similar to FIG. 1, showing a synchronization correction circuit according to a second embodiment of the present invention.

FIG. 3 is a schematic block diagram showing a second embodiment of the synchronization circuit according to the present invention. In this modification, a cumulative error counter 40 is inserted between the comparator 18 and the correction value calculator 20 of the synchronization circuit shown in FIG. 1. In the embodiment of FIG. 1, the period of the clocks 124 is corrected every period of the packet sync 102. In the present modification, the period of the clocks 124 is corrected every plural periods of the packet sync 102. In FIG. 3, circuits other than the cumulative error counter 40 are the same as those depicted with the same reference numerals in FIG. 1.

The cumulative error counter 40 is adapted for cumulating the periodic errors 112, output from the comparator 18 every preset time interval equal to an integer multiple of the period of the packet sync 102, to calculate a cumulative error 130. The cumulative error counter 40 includes e.g., a domain counter, not shown, and an error cumulating circuit, also not shown. The domain counter is adapted to count the packet sync 102, output by the sync generator 10, to generate a trigger 132 every preset number of the periods of the packet sync 102 to output the so produced triggers to the error cumulating circuit and to the correction value calculator 20.

The error cumulating circuit cumulates the period errors 112 output from the comparator 18 every period of the packet-sync 102 to output the so cumulated error 130. When supplied with the trigger 132 from the domain counter, the error cumulating circuit resets the cumulative error to '0'. The cumulative error 130 obtained in the error cumulating circuit is output to the correction value calculator 20.

Figure 4:
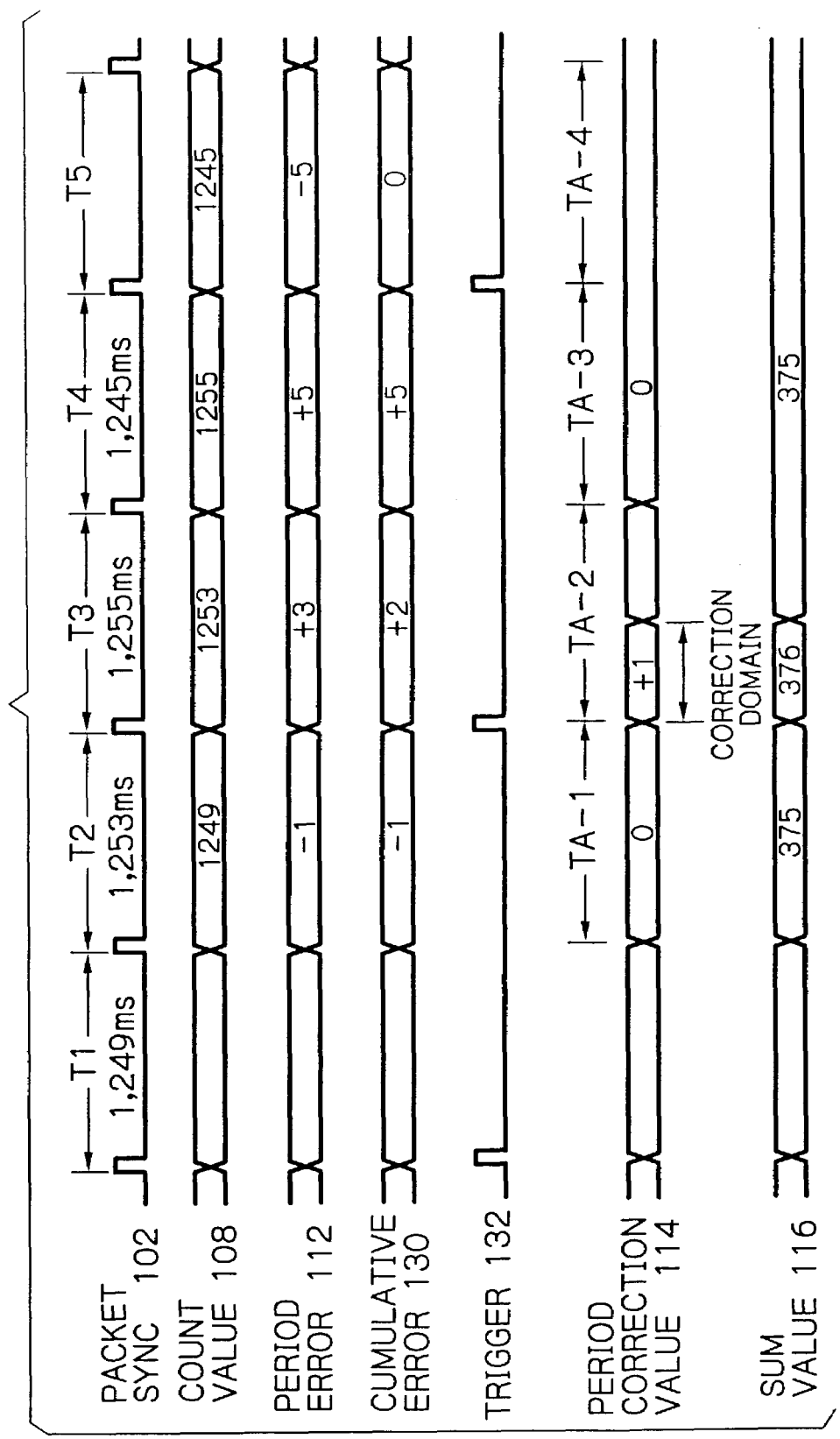
FIG. 4 is a timing chart, similar to FIG. 2, useful for understanding the operation of the synchronization correction circuit shown in FIG. 3.

The operation of the synchronization circuit, constructed as described above, is now described with reference to a case the cumulated error 130 is output from the cumulative error counter 40 every two periods of the packet sync 102, with the count 108 of the transmission interval counter 14 for the periods T1 to T4 of the packet sync 102 being '1249', '1253' '1255' and '1245', respectively, as shown in FIG. 4. The values of the period error 112, output from the comparator 18, is −1, +3, +5 and −5, for the periods T1 to T4, respectively. The cumulative error counter 40 sums the period error −1 for the period T1 to the period error +3 for the period T2 to calculate the cumulated error 130 for the periods T1 and T2, while summing the period error +5 for the period T3 and the period error −5 for the period T4 to calculate the cumulated error 130 for T3 and T4. In this case, the cumulated error 130 is +2 and 0 for each of the periods T1-T2 and the periods T3-T4, respectively.

When the trigger 132 is supplied from the cumulative error counter 40, the correction value calculator 20 calculates the period correction value 114 and the correction time domain for correcting the period of the clocks 124 based on the cumulative error 130 as output from the cumulative error counter 40. In the embodiment shown in FIG. 4, the cumulated error 130 for the periods T1-T2 is +2, so that the correction value calculator 20 determines that the intra-device transmission period has to be elongated by 2 μsec and accordingly sets the period correction value 114 and the correction time domain so as to output 48 cycles of the clocks 124 having the period of (15.625+1/24) μsec. Since the period correction value 114 is +1 and the correction time domain is 48 cycles of the clocks 124, the correction value calculator 20 outputs the period correction value 114 with the value of +1 during the correction period in the intra-device transmission period TA-2 for the period T2, while outputting the period correction value 114 having the value '0' during a domain or time period other than the correction time domain.

Since the cumulative error 130 during the periods T3-T4 is '0', the correction value calculator 20 determines that it is unnecessary to correct the period of the clocks 124. Accordingly, the correction value 114 with a value '0' is output from the correction value calculator 20 during the intra-device transmission period TA-4 for the period T4. Meanwhile, in the intra-device transmission period TA-1 for the period T1 and in the intra-device transmission period TA-3 for the period T3, the period of the clocks is not corrected, so that the period correction value 114 with a value '0' is output during this period of time.

In the second embodiment, in which the period correction processing for the clocks 124 is carried out with a period equal to a multiple of the period of the packet sync 102, power consumption can be made lower than in the case the correction processing is carried out on the period-by-period basis. Moreover, it becomes possible to reduce changes in the bit rate caused by correcting the period of the clocks 124 to carry out the correction uniformly. It is of course possible to control the occurrence of underflow or overflow in voice data processing to prevent the sound quality from being lowered.

Figure 5:
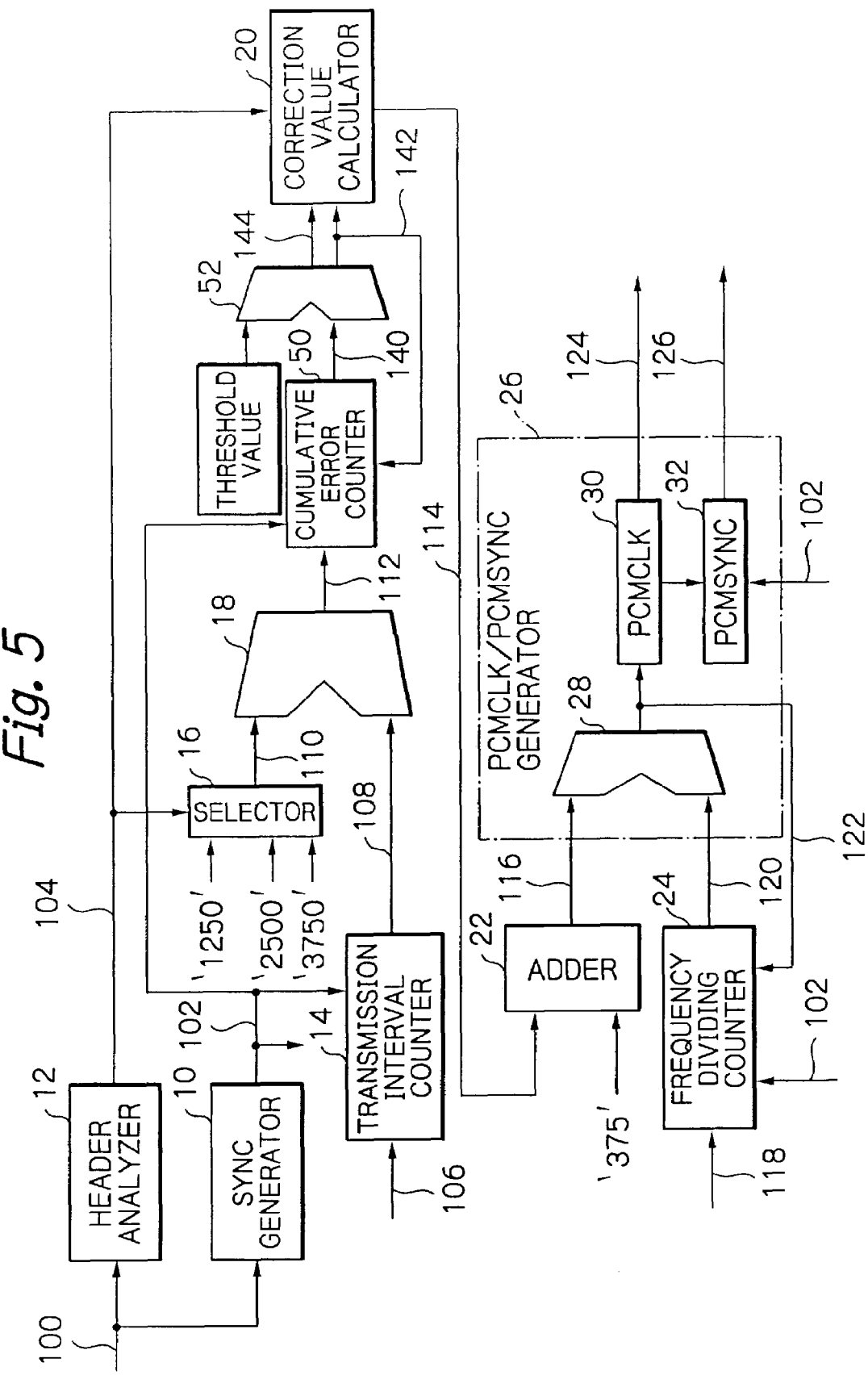
FIG. 5 is a schematic block diagram, similar to FIG. 1, showing a synchronization correction circuit according to a third embodiment of the present invention.

FIG. 5 is a schematic block diagram showing a third embodiment of the synchronization correction circuit according to the present invention. In this modification, a cumulative error counter 50 and a comparator 52 are used in place of the cumulative error counter 40 in the synchronization correction circuit shown in FIG. 3. The synchronization correction circuit of FIG. 3 corrects the period of the clocks 124 every plural periods of the packet synchronization signal 102. In the present modification, the period of the clocks 124 is corrected when the cumulative error 140 has exceeded a preset threshold value. Meanwhile, the circuitry except a cumulative error counter 50 and a comparator 52 is the same as that depicted with the corresponding reference numerals in FIG. 3.

The cumulative error counter 50 is adapted to integrate the period errors 112 output from the comparator 18, and includes an error cumulating circuit, a subtraction circuit and a comparator circuit, not shown. The error cumulating circuit cumulates the period errors 112 output from the comparator 18 to output a cumulative error 140. When a trigger 142 is supplied from the comparator 52, the subtraction circuit reads out the cumulative error from the error cumulating circuit, and subtracts, from the absolute value thereof, a preset value which is of the same value as the threshold value afforded to the comparator 52 and which is equal to '16' in the present embodiment. The subtraction circuit appends the same sign (positive or negative) as the sign of the cumulative error 140 to the result of subtraction for setting in the error cumulating circuit. This diminishes the absolute value of the cumulative error 140 in the error cumulating circuit by '16' when the trigger is supplied from the comparator 52 to the error cumulating circuit.

On the other hand, the comparator of the cumulative error counter 50 compares the absolute value of the period error 112, input from the comparator 18, to a preset threshold value, such as '32'. When the absolute value of the period error 112 exceeds the threshold value '32', the comparator determines the state as being a packet error, and outputs an abnormality signal to the error cumulating circuit, correction value calculator 20 and to a controller, not shown. The error cumulating circuit sets the value of the cumulative error 140 to zero, while the correction value calculator 20 resets the correction processing and the controller terminates an SCO (synchronous connection oriented) link.

The circuitry shown in FIG. 5 includes a comparator 52, connected to the cumulative error counter 50, which is a trigger generating circuit for generating a trigger 142 which commands the beginning of the correction. The comparator 52 compares the absolute value of the cumulative error 140, output from the cumulative error counter 50, to a preset threshold value, such as '16'. If the absolute value of the cumulative error 140 exceeds the threshold value, the comparator 52 outputs a trigger 142 and a sign signal 144 indicating the sign (positive or negative) of the cumulative error 140 to the correction value calculator 20, while outputting the trigger 142 to the cumulative error counter 50. When supplied with the trigger 142 from the cumulative error counter 50, the correction value calculator 20 in the present embodiment computes the period correction value 114 and the correction time domain for correcting the error +16 or −16, which is 16 (the same value as the threshold value) having appended thereto a sign indicated by a sign signal 144 output from the cumulative error counter 50.

Figure 6:
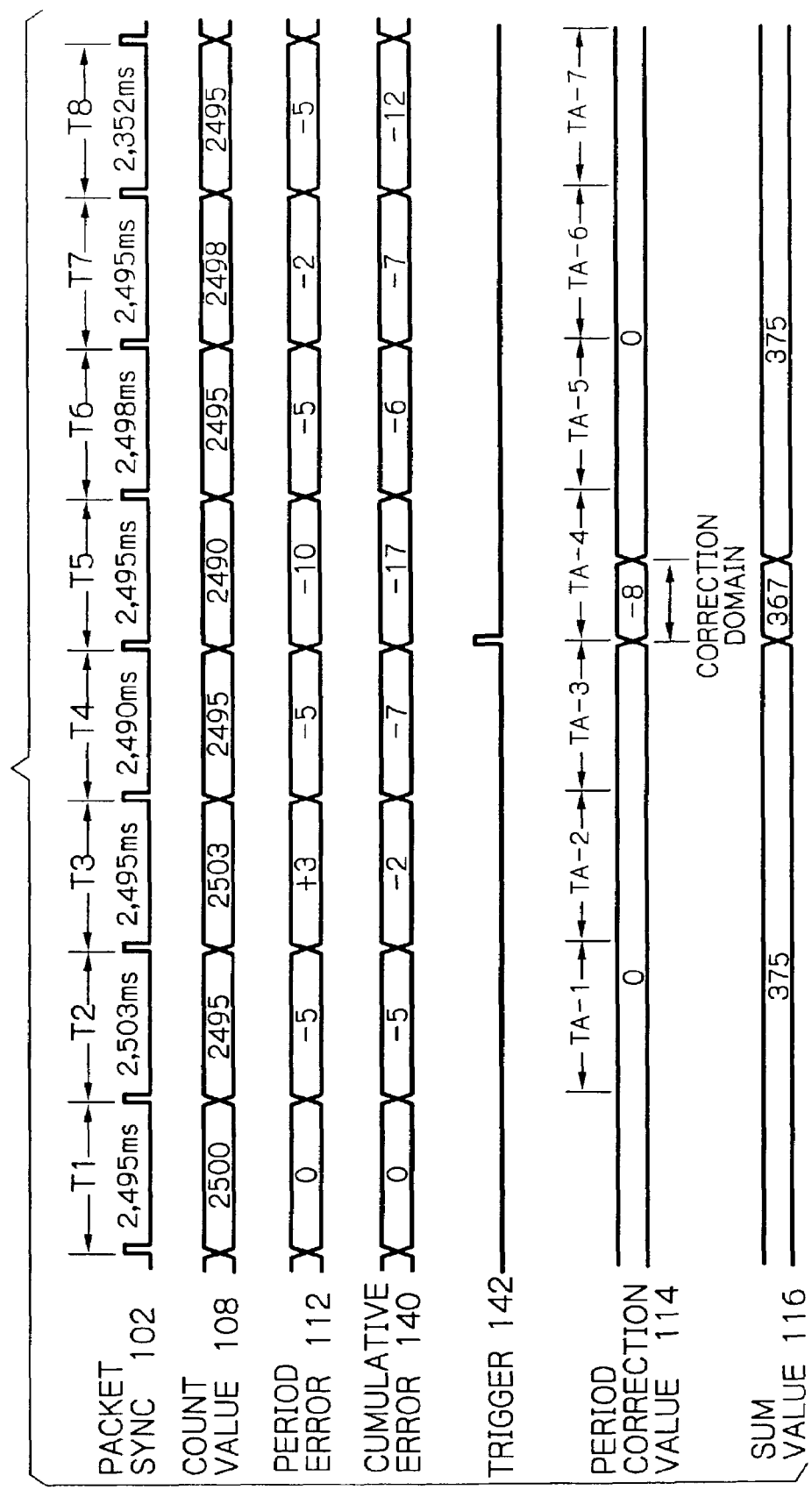
FIG. 6 is a timing chart, similar to FIG. 2, useful for understanding the operation of the synchronization correction circuit shown in FIG. 5.

The operation of the synchronization correction circuit, constructed as described above, is now described for such a case wherein the counts 108 of the transmission interval counter 14 for the periods T1 to T17 of the packet synchronization signal 102 are '2495', '2503', '2495', '2490', '2495', '2498' and '2495', for the packet type of HV 2, as shown in FIG. 6. The values of the period error 112 output from the comparator 18 are −5, +3, −5, −10, −5, −2 and −5, for the periods T1-T7, respectively. The cumulative error counter 50 cumulates the period error 112 output from the comparator 18 to output the cumulative error 140 to the comparator 52.

The comparator 52 compares the cumulative error 140 output from the cumulative error counter 50 to the threshold value 16. In the embodiment of FIG. 6, the cumulative error 140 from the period T1 to the period T4 is −17, assuming that the error 112 and the cumulative error 140 for the period T0 are both zero. Since the absolute value of the cumulative error 140 exceeds 16, the comparator 52 now outputs a trigger 142 and a sign signal 144 indicating the negative sign (−). The sign signal 144 is input to the correction value calculator 20, while the trigger 142 is input to the correction value computing circuit 20 and to the cumulative error counter 50. On receipt of the trigger 142, the cumulative error counter 50 subtracts 16 from the absolute value 17 of the cumulative error 140 and appends the negative sign (−) of the cumulative error 140 to the result of subtraction to set −1 as the new cumulative error 140.

When supplied from the comparator 52 with the trigger 142 and the sign, the correction value calculator 20 calculates the period correction value 114 and the correction time domain for correcting the period of the clocks 124, with 16 and the sign appended thereto, here −16, as the cumulative error. In this case, if 48 cycles of the clocks 124, with a period of (15.625−8/24) μsec, are output from the PCMCLK generator 30, the intra-device transmission period may be diminished by 16 μsec. Thus, the period correction value 114 is set to −8 and the correction time domain is set to 48 cycles of the clocks 124. In the intra-device transmission period TA-4 for the period T4, the correction value calculator 20 outputs the period correction value 114 with a value of −8 for a time interval corresponding to 48 cycles of the clocks 124 (correction time domain) in the intra-device transmission period TA-4 for the period T4, while outputting the period correction value 114 with a value '0' for the time interval other than the correction time domain.

The adder 22 sums the value of the period correction value 114 to the value '375' to output a sum 116 to the comparator 28 of the PCMCLK/PCMSYNC generator 26. Meanwhile, the value of the sum 116 is '367' and '375' for the correction value 114 of −8 and 0, respectively. The comparator 28 compares the sum 116 from the adder 22 to the count 120 from the frequency dividing counter 24 to output a pulse 122 when the count 120 coincides with the correction value 116 (here '367' or '375'). The frequency dividing counter 24 resets the counter by this pulse 122. Accordingly, the comparator 28 outputs a pulse 122 with a period of (15.625−8/24) μsec, for the correction time domain, while outputting the pulse 122 with a period of 15.625 μsec for a time domain or time period other than the correction time domain. The pulse 122 is input to the PCMCLK generator 30, while clocks 124 and synchronization signals 126 are output from the PCMCLK generator 30 and from the PCMSYNC generator 32, respectively.

The Thus, in the third embodiment, the processing of increasing or decreasing the period of the clocks 124 is started when the cumulative error of the period of the packet sync 102 exceeds a preset threshold value, so that the bit rate does not have to be changed frequently as in the case of making corrections on the period by period basis, such that the voice data can be transmitted at all times with a constant sound quality. If the threshold value is set to values equal to powers of 2, such as 16 or 32, the circuit is simplified in structure and reduced in size.

Figure 7:
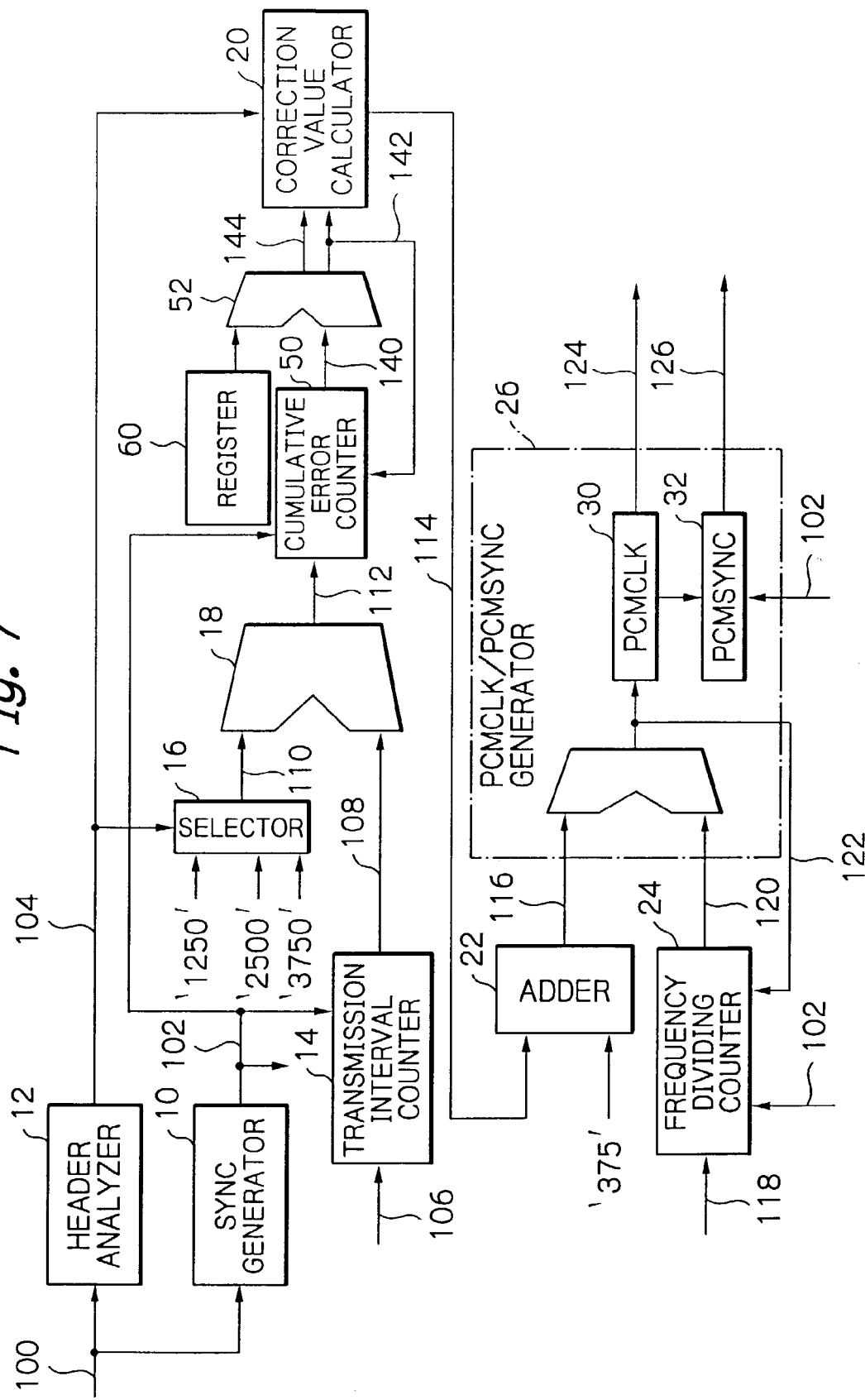
FIG. 7 is a schematic block diagram, similar to FIG. 1, showing a synchronization correction circuit according to a fourth embodiment of the present invention.
Figure 8A:
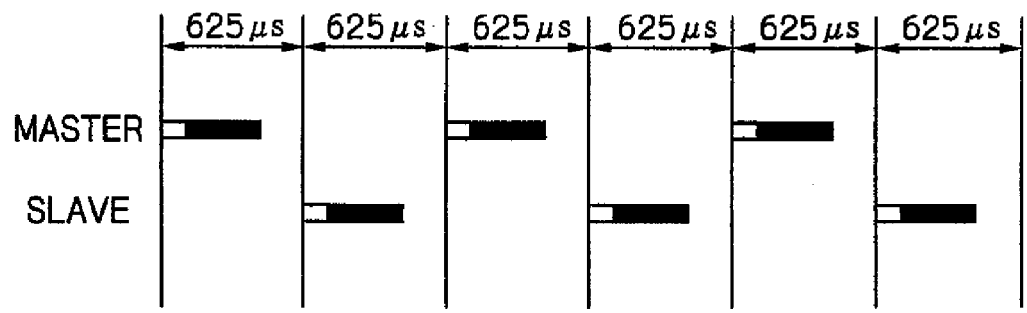
FIGS. 8A, 8B and 8C show how packet transmission intervals are according to Bluetooth standard.
Figure 8B:
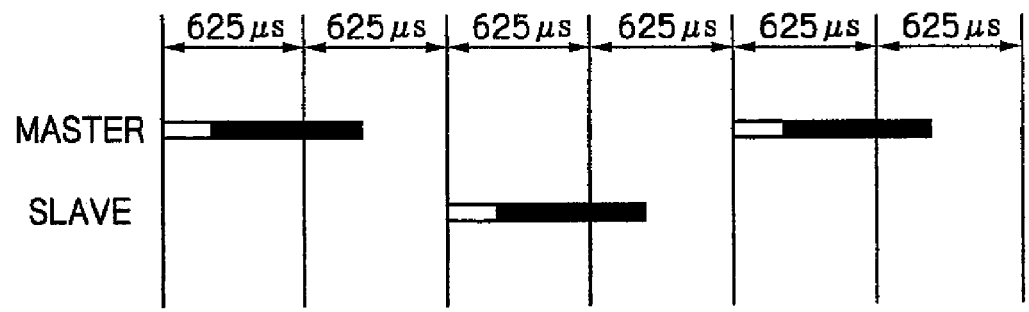
Figure 8C:
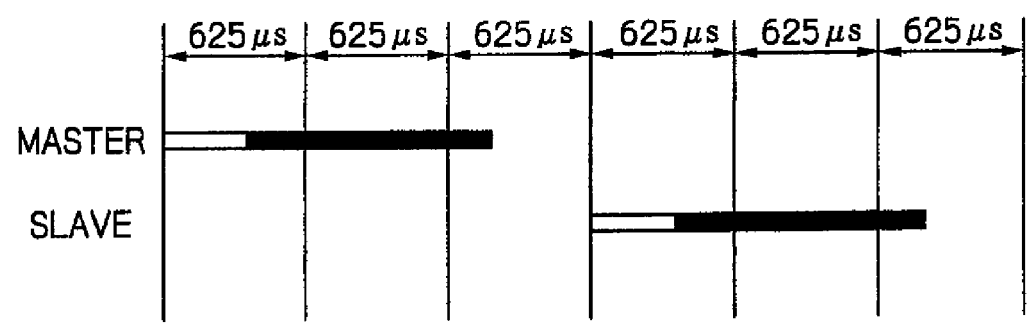
Figure 9:
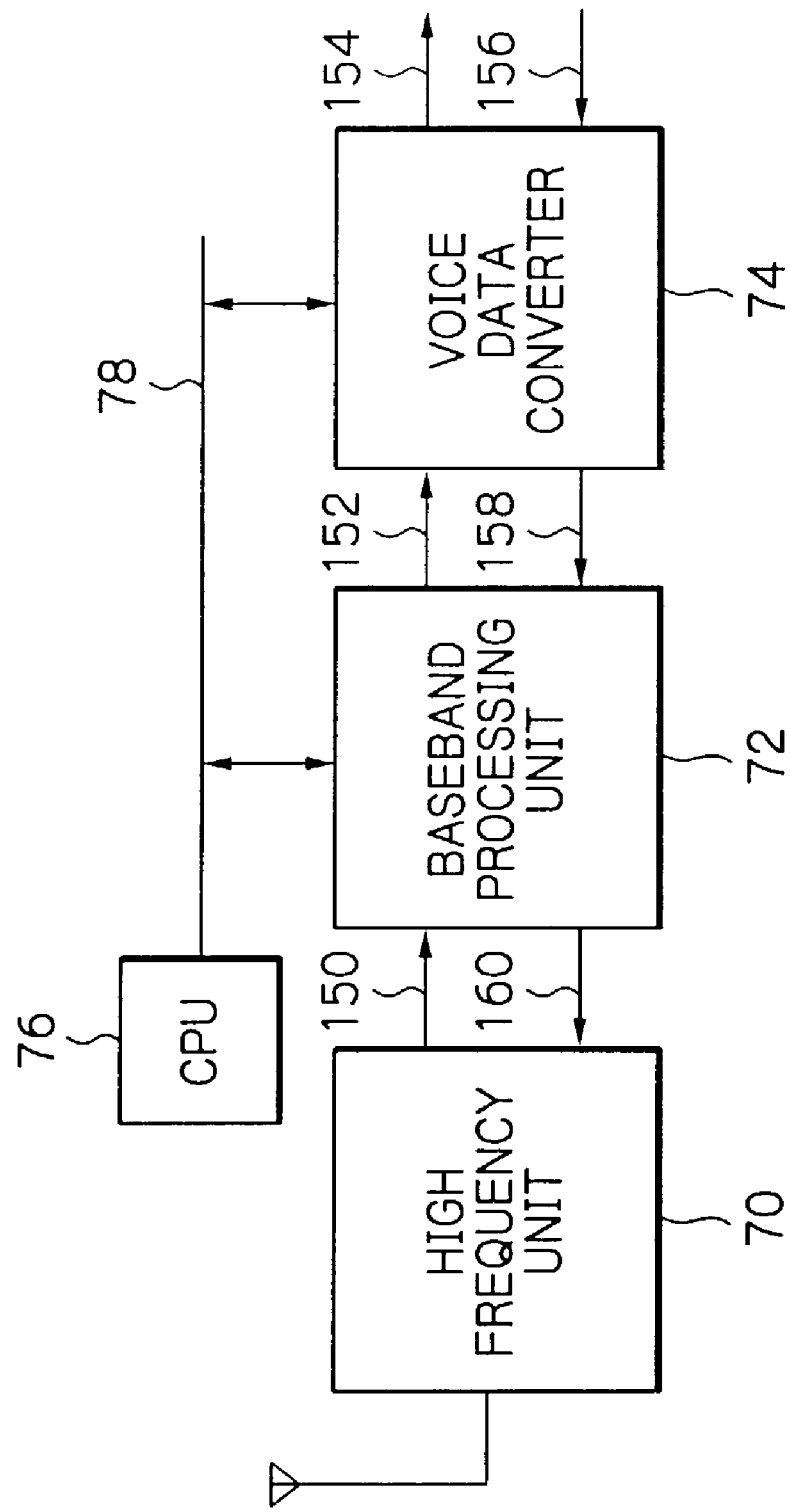
FIG. 9 is a schematic block diagram showing the structure of a conventional radio transmitter-receiver.

FIG. 7 is a schematic block diagram showing a fourth embodiment of the synchronization correction circuit according to the present invention. In this embodiment, a threshold value register 60, in which to store a threshold value, is connected to the comparator 52 of the synchronization correction circuit shown in FIG. 5. The threshold value used in the comparator 52 in FIG. 5 is fixed at '16'. The threshold value register 60 of the present embodiment is connected to a controller, not shown, such that any desired threshold value can be set in the register 60 by the controller. This renders it possible to dynamically accommodate changes in the shift of the transmission interval caused by the good or bad transmission state.

The entire disclosure of Japanese patent application No. 2002-067927 filed on Mar. 13, 2002, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A synchronization correction circuit comprising:
a synchronization signal generator for detecting a synchronization word contained in a received packet to generate a packet synchronization signal synchronized with the received packet;
a period error detector for measuring a period of the packet synchronization signal generated in said synchronization signal generator to calculate a period error with respect to a reference interval;
a cumulative error counter for cumulating the period error as calculated by said period error detector every plural periods of the packet synchronization signal to calculate a cumulative period error;
a correction value calculator for calculating a period correction value per one clock signal and a number of clock signals to be corrected for a clock period so that a sum of the period correction values per one clock signal will be coincident with the cumulative period error; and
a clock signal generator for generating clock signals of a predetermined reference period when the period correction value is zero, and for generating, when the period correction value is different than zero, a number calculated in said correction value calculator of clock signals, a period of which has been corrected based on the period correction value.

2. The synchronization correction circuit according to claim 1, wherein said clock signal generator comprises:
an adder for summing a predetermined value with the period correction value as calculated in said correction value calculator;

a counter for counting high-speed clock signals;

a comparator for outputting pulses when a count of said counter coincides with a sum obtained in said adder; and a synchronization pulse generator for wave-shaping a waveform of pulses output by said comparator to generate the clock signals, said counter resetting the count by pulses output from said comparator.

3. The synchronization correction circuit according to claim 1, wherein said period error detector includes a header analysis part for detecting a packet type from the received packet, and wherein a value of the reference interval is determined from the packet type detected by said header analysis part.

4. The synchronization correction circuit according to claim 2, wherein a period of said high-speed clock signals and the sum obtained in said adder are set so that a product of a period of the high-speed clock signals and the sum obtained in said adder will be equal to the predetermined reference period.

5. A synchronization correction circuit comprising:

a synchronization signal generator for detecting a synchronization word contained in a received packet to generate a packet synchronization signal synchronized with the received packet;

a period error detector for measuring a period of the packet synchronization signal generated in said synchronization signal generator to calculate a period error with respect to a reference interval;

a cumulative error counter for sequentially cumulating the period error calculated in said period error detector and sequentially outputting the cumulated period error each time the period error has been cumulated;

a first comparator for comparing the cumulated period error output from said cumulative error counter to a threshold value to output a trigger when the cumulated period error has exceeded the threshold value;

a correction value calculator for calculating a period correction value per one clock signal and a number of clock signals to be corrected for a clock period, when a trigger is output from said first comparator, so that a sum of the period correction values per one clock signal will be coincident with the threshold value; and a clock signal generator for generating clock signals of a predetermined reference period when the period correction value is zero, and for generating, when the period correction value is different than zero, a number calculated in said correction value calculator of clock signals, a period of which has been corrected based on the period correction value, said cumulative error counter subtracting the period correction value from the cumulated period error when the trigger is output from said first comparator.

6. The synchronization correction circuit according to claim 5, wherein said clock signal generator comprises:

an adder for summing a predetermined value with the period correction value as calculated in said correction value calculator;

a counter for counting high speed crock signals;

a second comparator for outputting pulses when a count of said counter coincides with a sum obtained in said adder, and a synchronization pulse generator for wave-shaping a waveform of pulses output by said second comparator to generate the clock signals, said counter resetting the count by pulses output from said second comparator.

7. The synchronization correction circuit according to claim 5, wherein said period error detector includes a header analysis part for detecting a packet type from the received packet, and wherein a value of the reference interval is determined from the packet type detected by said header analysis part.

8. The synchronization correction circuit according claim 5, wherein the threshold value used in said first comparator is stored in a register, and wherein the threshold value stored in said register can be set externally to any optional value.

9. The synchronization correction circuit in accordance with claim 6, wherein a period of said high-speed clock signals and the sum obtained in said adder are set so that a product of a period of the high-speed clock signals and the sum obtained in said adder will be equal to the predetermined reference period.

* * * * *